United States Patent
Hartman et al.

(10) Patent No.: US 11,431,398 B2
(45) Date of Patent: Aug. 30, 2022

(54) SYSTEMS AND METHODS FOR AUTONOMOUSLY CONFIGURING FIFTH GENERATION (5G) NETWORK REPEATERS

(71) Applicant: Verizon Patent and Licensing Inc., Basking Ridge, NJ (US)

(72) Inventors: Robert J. Hartman, Plainfield, NJ (US); Samirkumar Patel, Middlesex, NJ (US); Yann Sendra, McLean, VA (US); Paul R. McDonough, Marlboro, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 85 days.

(21) Appl. No.: 17/120,867

(22) Filed: Dec. 14, 2020

(65) Prior Publication Data

US 2022/0190901 A1 Jun. 16, 2022

(51) Int. Cl.
| | |
|---|---|
| *H04B 7/06* | (2006.01) |
| *H04L 5/14* | (2006.01) |
| *H04W 84/04* | (2009.01) |
| *H04W 72/04* | (2009.01) |
| *H04L 1/18* | (2006.01) |

(52) U.S. Cl.
CPC .............. *H04B 7/0695* (2013.01); *H04L 1/18* (2013.01); *H04L 5/14* (2013.01); *H04W 72/0433* (2013.01); *H04W 84/045* (2013.01)

(58) Field of Classification Search
CPC .............. H04W 84/045; H04W 84/042; H04W 84/047; H04W 72/0433; H04W 72/0426; H04W 72/0413; H04W 72/0406; H04W 72/0446; H04W 72/0453; H04W 72/04; H04W 72/044; H04B 7/0695; H04B 7/0678; H04B 7/068; H04B 7/0684; H04B 7/0667; H04B 7/0619; H04L 1/18; H04L 1/16; H04L 1/1607; H04L 5/14; H04L 5/02; H04L 5/22; H04L 5/023; H04L 5/0091
See application file for complete search history.

(56) References Cited

U.S. PATENT DOCUMENTS

| | | | |
|---|---|---|---|
| 2016/0286410 A1* | 9/2016 | O'Malley | H04W 24/02 |
| 2016/0286414 A1* | 9/2016 | Zhou | H04W 36/0085 |
| 2018/0191572 A1* | 7/2018 | Ben-Haim | H04L 41/0853 |
| 2020/0145068 A1* | 5/2020 | Chendamarai Kannan | H04L 5/0057 |

* cited by examiner

*Primary Examiner* — Phong La

(57) ABSTRACT

A device may receive location data identifying a location of a network repeater and an identifier of a base station serving the network repeater, and may identify, based on the identifier of the base station, a first set of gNodeBs anchored to the base station. The device may identify, based on the location data, a second set of gNodeBs from a data structure, and may compare the first set of gNodeBs and the second set of gNodeBs to determine a list of gNodeBs included in the first set of gNodeBs and the second set of gNodeBs. The device may rank the list of gNodeBs, based on coverage projection recommendations, to generate a ranked list of gNodeBs, and may receive, from the data structure, configuration parameters for the ranked list of gNodeBs. The device may provide the configuration parameters for the ranked list of gNodeBs to the network repeater.

20 Claims, 10 Drawing Sheets

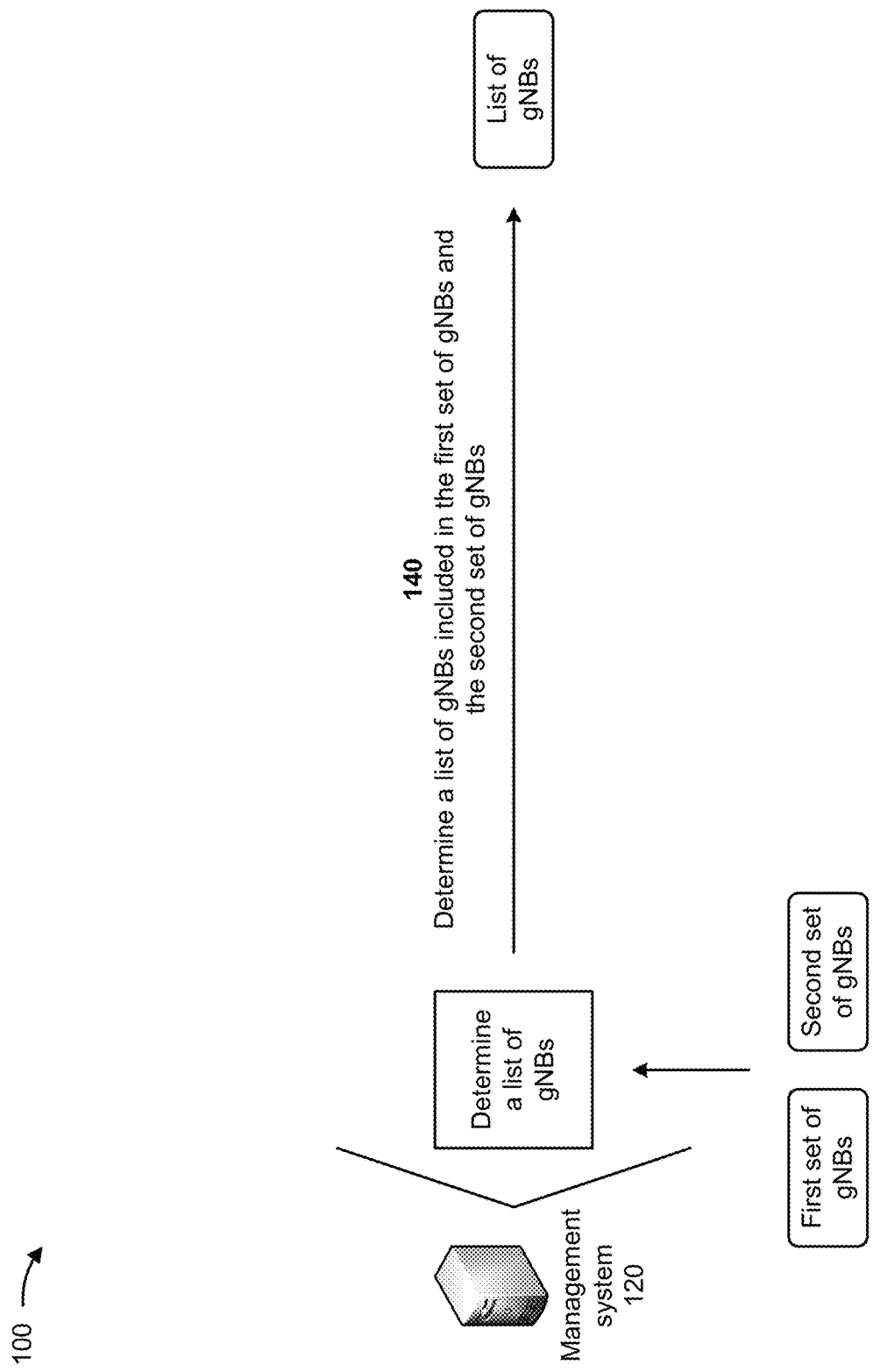

SYSTEMS AND METHODS FOR AUTONOMOUSLY CONFIGURING FIFTH GENERATION (5G) NETWORK REPEATERS

BACKGROUND

A network repeater or a network extender (referred to hereinafter as a network repeater) utilizes beamforming technology to expand coverage. Thus, network repeaters may add network density in terms of coverage, but not in terms of physical infrastructure, especially for the millimeter wave spectrum (e.g., the fifth generation (5G) spectrum). By focusing a wireless signal towards a receiving device, rather than allowing the wireless signal to spread in all directions, the beamforming of a network repeater may create a more direct, and faster connection.

BRIEF DESCRIPTION OF THE DRAWINGS

FIGS. 1A-1G are diagrams of an example associated with automated remote network performance monitoring.

DETAILED DESCRIPTION OF PREFERRED EMBODIMENTS

Figure 1A:
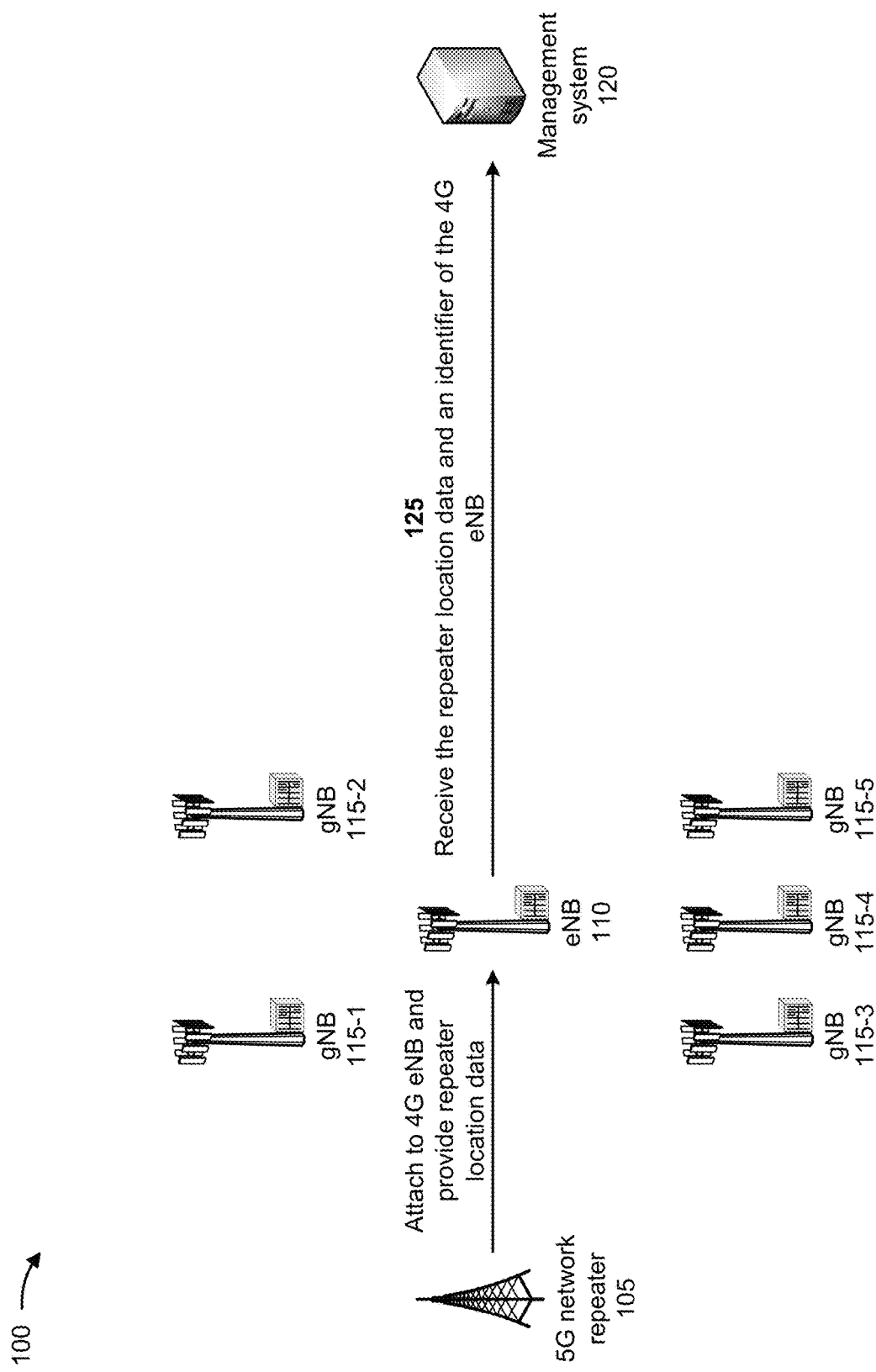

The following detailed description of example implementations refers to the accompanying drawings. The same reference numbers in different drawings may identify the same or similar elements.

Network repeaters are used to extend coverage of millimeter wave since a free space path loss (FSPL) of frequencies in the millimeter wavelength is much higher than that used in other wireless communication networks. Network repeaters are a preferred choice of extending network coverage since network repeaters do not need backhaul nor require an expensive installation process as that of a base station. Network repeaters may utilize beam steering technology and, when deployed, may require information, such as, power detection information (e.g., a received signal strength indicator (RSSI), a reference signal received power (RSRP), and/or the like), to ensure proper beam alignment from the network repeater to a base station (e.g., a gNB). The network repeaters may utilize the required information to commission and properly setup the correct beam from the network repeaters to the correct beam from the base station to establish the best possible connection.

In some cases, a network repeater may be installed in a time division duplexing (TDD) system. In these cases, the network repeater may require information, such as, timing information, TDD uplink slot information, TDD downlink slot information, symbol patterns, and/or the like. The required information may enable the network repeater to synchronize transmit and receive switches within the network repeater to properly align with the network, to retransmit in alignment with the network, and/or the like.

Since network repeaters do not include a 5G modem, network repeaters do not indicate 5G capability to a 5G network, and thus no network information is provided to network repeaters. An initial configuration of a network repeater requires information that can be found in a master information block (MIB) and/or a system information blocks. (SIB). Without the MIB and/or SIB information, the network repeater may be unable to autonomously install and setup on the 5G network. Currently, a 5G customer premises equipment (CPE) or user equipment (UE) with a full stack modem may be utilized to initially configure a network repeater. The CPE or the UE may provide necessary information (e.g., key performance indicators (KPIs), parameters, and/or the like) to the network repeater, via a Bluetooth connection or other communication interface, for initial configuration and/or periodic maintenance. However, this requires a 5G CPE or UE to be present and does not allow for autonomous configuration of the network repeater.

Thus, current techniques for configuring 5G network repeaters waste computing resources (e.g., processing resources, memory resources, communication resources, and/or the like) and networking resources.

Some implementations described herein provide a repeater management system that autonomously configures 5G network repeaters. For example, the management system may receive location data identifying a location of a network repeater and relative to that location may identify the appropriate identifier of a base station serving the network repeater and may identify, based on the identifier of the base station, a first set of gNBs anchored to the base station. The management system may identify, based on the location data, a second set of gNBs from a data structure and may compare the first set of gNBs and the second set of gNBs to determine a list of gNBs included in the first set of gNBs and the second set of gNBs. The management system may rank the list of gNBs, based on coverage projection recommendations, to generate a ranked list of gNBs and may receive, from the data structure, configuration parameters for the ranked list of gNBs. The management system may provide the configuration parameters for the ranked list of gNBs to the network repeater.

In this way, the management system autonomously configures 5G network repeaters. The 5G network repeaters may include low cost modules (e.g., category (CAT) M1 modules, CAT1 modules, CAT3 modules, CAT4 modules, and/or the like) that utilize widely available, previous generation (e.g., 4G, 3G, and/or the like) technology to enable the 5G network repeaters to communicate with the management system and a 5G network over traditional non-millimeter wave frequency bands. Through this means of communication, the 5G network repeaters may be properly beam aligned and configured on the 5G network by the management system. Further, use of 5G network repeaters may extend network coverage without requiring a backhaul communication link. Thus, the management system conserves computing resources, networking resources, human resources, transportation resources, and/or the like that would otherwise have been utilized in utilizing a backhaul, having technicians travel to the 5G network repeaters, utilizing the technicians and 5G CPEs or UEs to configure the 5G network repeaters, and/or the like.

FIGS. 1A-1G are diagrams of an example 100 associated with autonomously configuring 5G network repeaters. As shown in FIGS. 1A-1G, example 100 includes a 5G network repeater 105, an eNodeB (eNB) 110, multiple gNBs 115-1 to 115-5 (referred to herein separately as gNB 115 or jointly as gNBs 115), and a management system 120. The 5G network repeater 105 may include a device that focuses a wireless signal toward a receiving device (e.g., eNB 110 or gNB 115) to create a direct, fast, and reliable connection. For example, the 5G network repeater 105 may include a network repeater (e.g., a device used to expand coverage of a network and/or to offset a cost of an additional eNB 110 and/or gNB 115), a dwelling repeater (e.g., a device used to extend mmWave coverage from outdoors to indoors), a commercial signal booster, an industrial signal booster, and/or the like). The 5G network repeater 105 may utilize beam forming technology to establish a link with network gNBs 115 to re-amplify and re-transmit mmWave communication signals. In this way, the 5G network repeater 105 may extend the coverage of the gNB 115, which may be limited due to power, FSPL, building infrastructures, foliage, and/or other types of natural and/or man-made elements. Thus, the 5G network repeater 105 may allow for network densification and expansion without the cost and overhead of additional mmWave base stations.

The eNB 110 may include one or more devices capable of transferring traffic, such as audio, video, text, and/or other traffic and may be associated with a Long Term Evolution (LTE) or fourth generation (4G) network. The gNB 115 may include one or more devices that support, for example, a cellular radio access technology (RAT) and wireless communication for 5G network repeater 105. The management system 120 may include a system that autonomously configures 5G network repeater 105.

As shown in FIG. 1A, the 5G network repeater 105 attaches to the eNB 110 and provides repeater location data to the eNB 110. The 5G network repeater 105 may automatically attach to the eNB 110 when powered on and based on a proximity between the 5G network repeater 105 and the eNB 110. For example, the 5G network repeater 105 may include a communication component (e.g., a CAT M1 module, a CAT1 module, a CAT3 module, a CAT4 modules, and/or the like) and, when initially powered on, the 5G network repeater 105 may utilize the communication component to connect to a network via a closest eNB (e.g., eNB 110, as shown in FIG. 1A).

The 5G network repeater 105 may determine a geographical location of the 5G network repeater 105 based on connecting to the network. For example, the 5G network repeater 105 may include a location device (e.g., a global positioning system (GPS) device and/or a similar type of device) and may utilize the location device to determine a geographical location of the 5G network repeater 105 based on connecting to the network. The 5G network repeater 105 may be capable of receiving GPS location data (e.g., Latitude, Longitude, and/or the like) passed to it from another device (e.g., a user device (UE), customer premise equipment (CPE), and/or the like) via a wireless communication link (e.g., a Bluetooth communication link) and stored via a Device Management system in the event the 5G network repeater 105 does not have a device for determining the geographical location of the 5G network repeater 105. The 5G network repeater 105 may provide repeater location information identifying the geographical location of the 5G network repeater 105 to the eNB 110. The communication component may enable the 5G network repeater 105 to communicate with the management system 120 over a non-millimeter wave frequency band. As shown by reference number 125, the management system 120 receives the repeater location data and an identifier of the eNB 110 from the eNB 110.

Figure 1B:
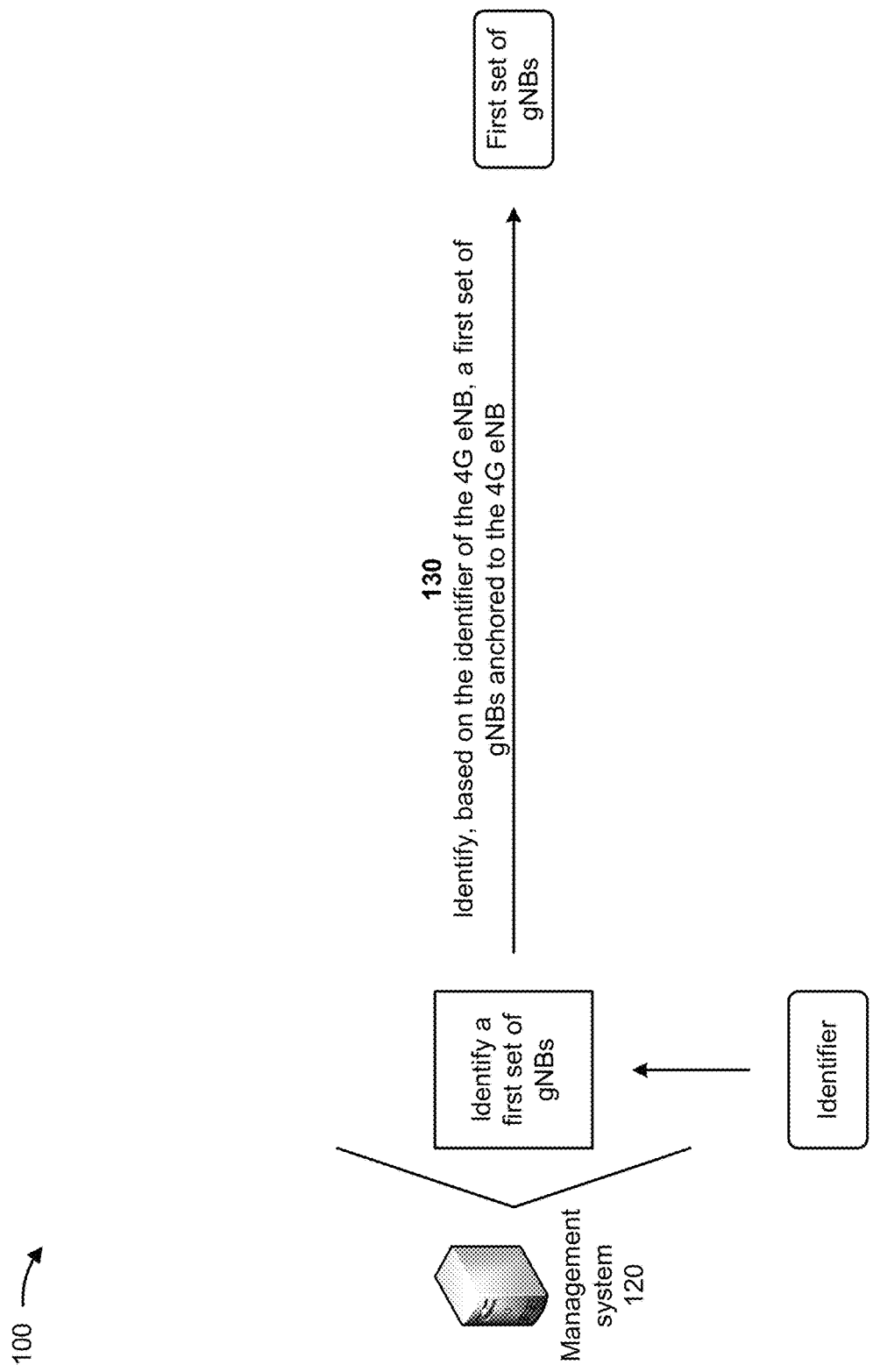

As shown in FIG. 1B, and by reference number 130, the management system 120 identifies, based on the identifier of the eNB 110, a first set of gNBs 115 anchored to the eNB 110. In some implementations, the management system 120 identifies the first set of gNBs 115 based on accessing a data structure (e.g., a database, a table, a list, and/or the like) storing information identifying gNBs 115 anchored to eNBs 110. Alternatively, and/or additionally, the management system 120 may receive information identifying the first set of gNBs 115 from the eNB 110. For example, the management system 120 may provide a query that requests identification of gNBs 115 anchored to the eNB 110. The management system 120 may receive information identifying the first set of gNBs 115 based on the query.

Figure 1C:
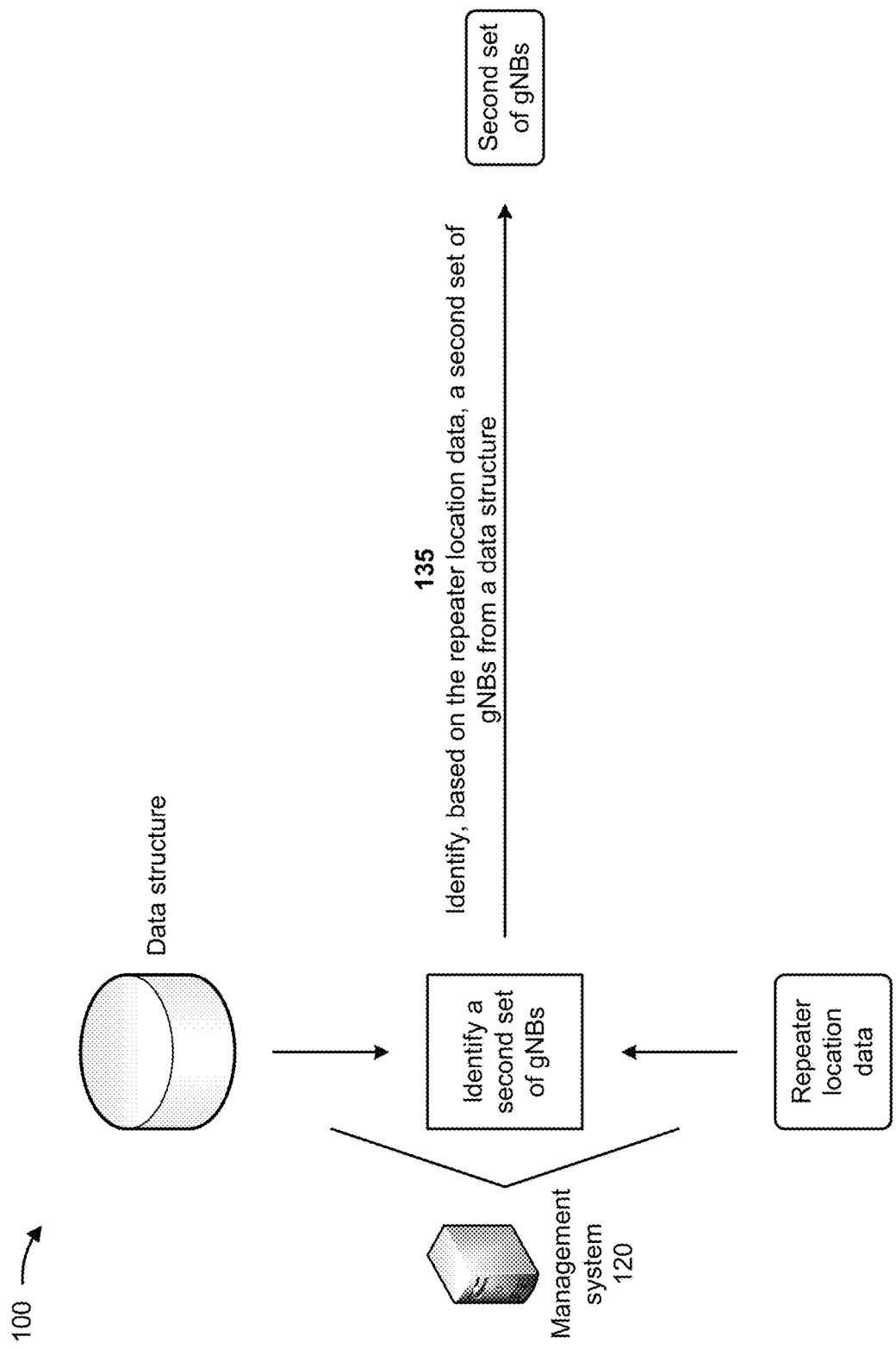

As shown in FIG. 1C, and by reference number 135, the management system 120 identifies, based on the repeater location data, a second set of gNBs 115 from a data structure. The data structure may store location information for a plurality of gNBs 115 associated with the network. The management system 120 may query the data structure to obtain information identifying gNBs 115 within a distance threshold (e.g., within 250 feet, within 500 feet, within 1,000 feet, and/or the like) of the location data. The management system 120 may obtain information identifying the second set of gNBs 115 based on querying the data structure.

As shown in FIG. 1D, and by reference number 140, the management system 120 determines a list of gNBs 115 included in the first set of gNBs 115 and the second set of gNBs 115. For example, the management system 120 may compare the first set of gNBs 115 and the second set of gNBs 115. The management system 120 may determine the list of gNBs 115 included in the first set of gNBs 115 and the second set of gNBs 115 based on the comparison.

In some implementations, the management system 120 determines that the gNBs 115, included in the list of gNBs 115, are connected to another eNB 110 that is different from the eNB 110 to which the 5G network repeater 105 is connected. The management system 120 may cause the eNB 110 to which the 5G network repeater 105 is connected to perform a handover operation to cause the 5G network repeater 105 to be connected to the other eNB 110.

Figure 1E:
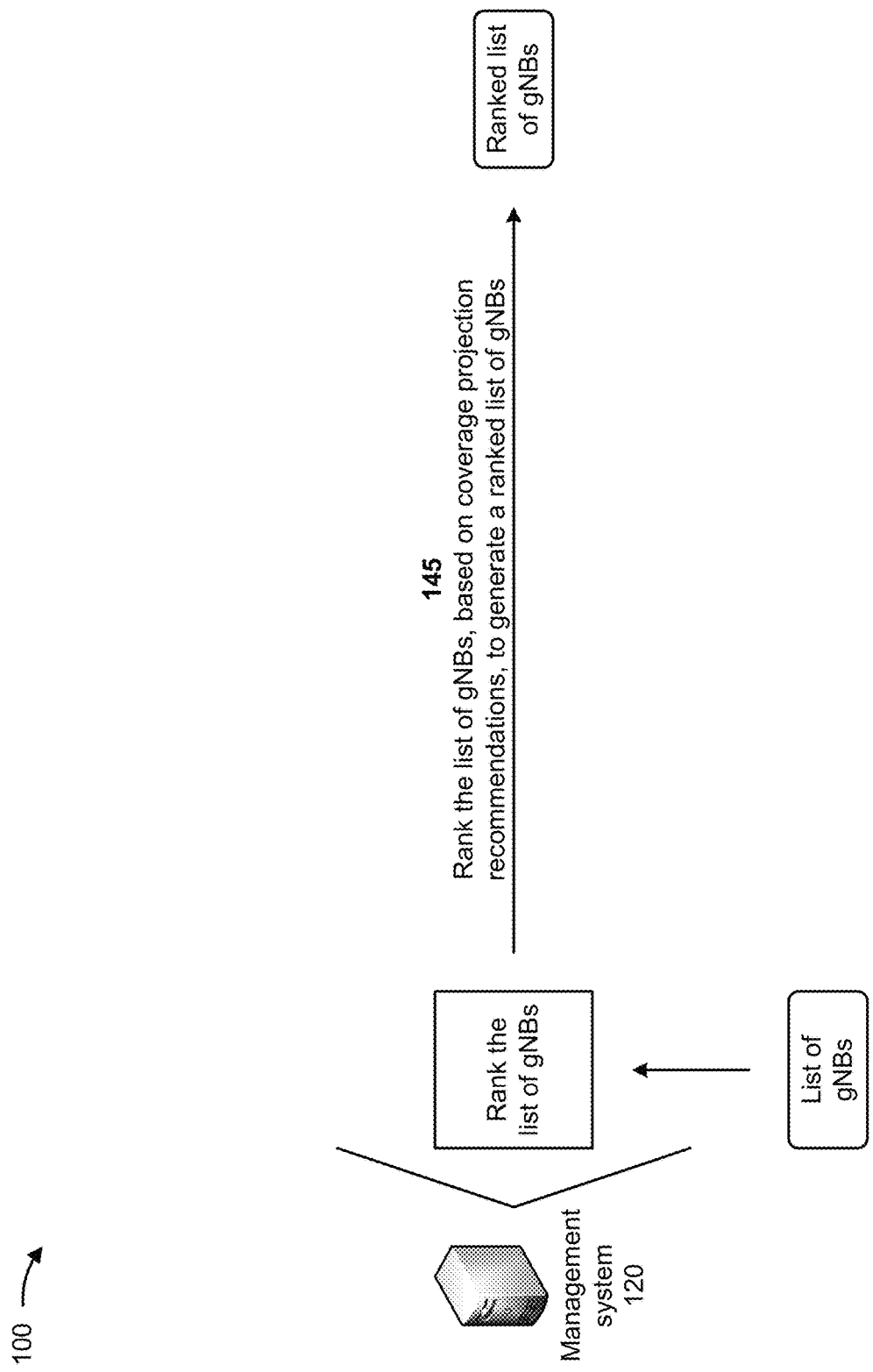

As shown in FIG. 1E, and by reference number 145, the management system 120 ranks the list of gNBs 115 based on coverage projection recommendations, to generate a ranked list of gNBs 115. The coverage projection recommendations may include information indicating coverage areas associated with the gNBs 115 included in the list of gNBs 115. The management system 120 may assign scores to the gNBs 115 included in the list of gNBs 115 based on the coverage projection recommendations associated with the gNBs 115. In some implementations, the scores may be assigned based on a position of the 5G network repeater 105 within the coverage areas of the gNBs 115. The management system 120 may rank the gNBs 115 based on the scores.

Figure 1F:
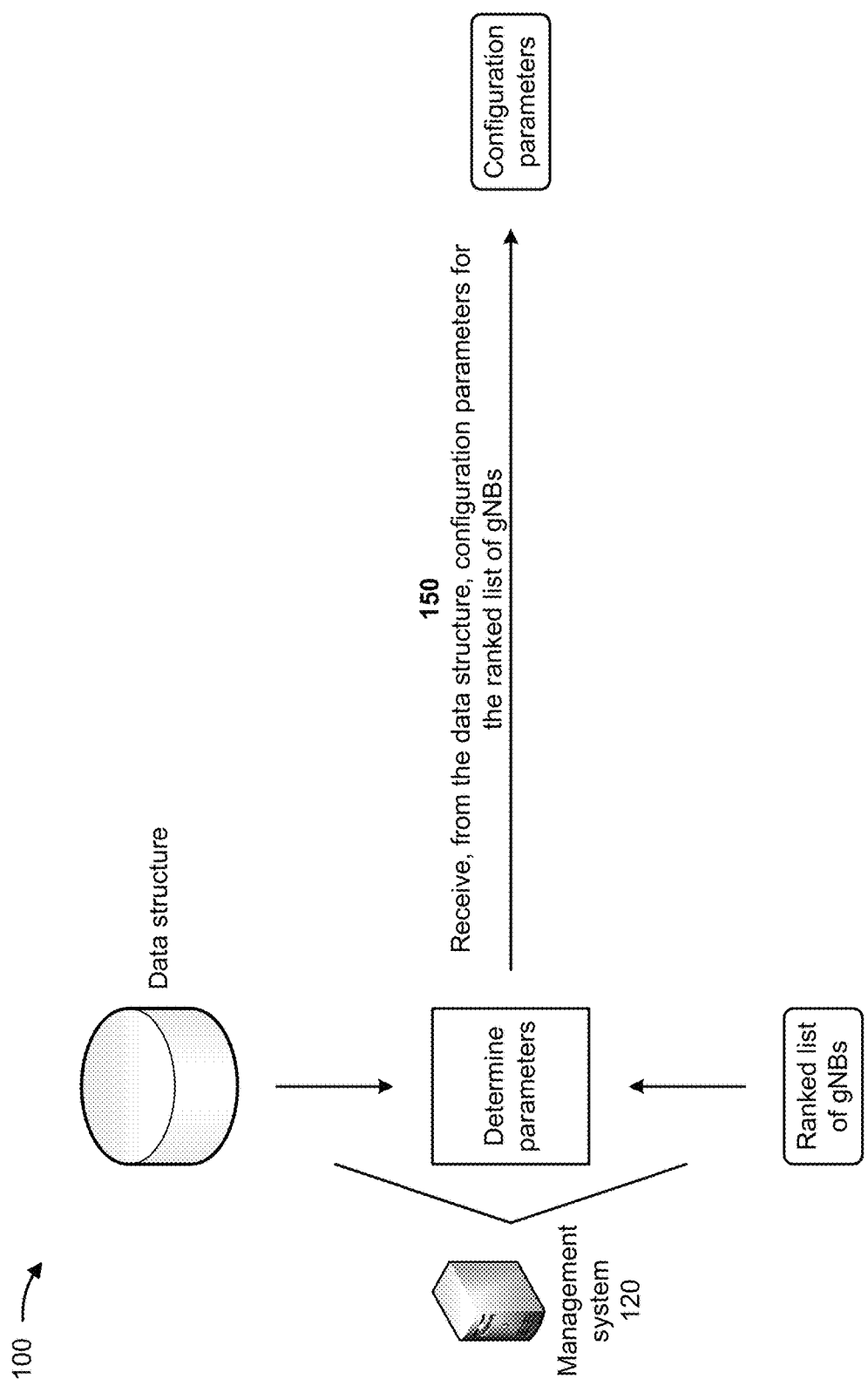

As shown in FIG. 1F, and by reference number 150, the management system 120 receives, from the data structure, configuration parameters for the ranked list of gNBs 115. The configuration parameters for a gNB 115 included in the ranked list of gNBs 115 may allow the 5G network repeater 105 to be automatically beam aligned and configured for attaching for attaching to the gNB 115. For example, the configuration parameters for the gNB 115 may include MIB data, SIB data, absolute radio frequency (RF) channel numbers associated the ranked list of gNBs, a band of operation (e.g., n260, n261, and/or the like) associated with the ranked list of gNBs, time division duplex timing information associated with the ranked list of gNBs, periodicity, uplink symbols, downlink symbols, uplink slots, downlink slots, a slot format indicator, subcarrier offsets associated with the ranked list of gNBs, subcarrier spacings associated with the ranked list of gNBs, physical cell identifiers associated with the ranked list of gNBs, and/or the like.

Figure 1G:

As shown in FIG. 1G, and by reference number 155, the management system 120 provides the configuration parameters for the ranked list of gNBs 115 to the 5G network repeater 105 via the eNB 110. The management system 120 may provide the configuration parameters for the ranked list of gNBs 115 to the eNB 110. The eNB 110 may receive the configuration parameters and may provide configuration parameters for one or more of the gNBs 115 included in the ranked list of gNBs 115 to the 5G network repeater 105. In some implementations, the eNB 110 may provide, to the 5G network repeater 105, configuration parameters associated with a first gNB 115 included in the ranked list of gNBs 115. In some implementations, the first gNB 115 is a highest ranking gNB 115 relative to the other gNBs 115 included in the ranked list of gNBs 115. The eNB 110 may determine whether the 5G network repeater 105 attaches to the first gNB 115.

When the 5G network repeater 105 fails to attach to the first gNB 115, the eNB 110 may provide, to the 5G network repeater 105, second configuration parameters associated with a second gNB 115 provided in the ranked list of gNBs 115. The second gNB 115 may be a second highest ranking gNB 115 relative to the other gNBs 115 included in the ranked list of gNBs 115. The eNB 110 may determine whether the 5G network repeater 105 attaches to the second gNB 115. The eNB 110 may continue providing configuration parameters to the 5G network repeater 105 in a similar manner until the 5G network repeater 105 attaches to a gNB 115.

As shown in FIG. 1G, the 5G network repeater 105 attaches to a gNB 115 included in the ranked list of gNBs 115 based on the configuration parameters. In this way, the management system 120 autonomously configures the 5G network repeater 105 thereby enabling the 5G network repeater 105 to be properly beam aligned and configured on the 5G network by the management system 120. Thus, the management system 120 conserves computing resources, networking resources, human resources, transportation resources, and/or the like that would otherwise have been wasted in having technicians travel to the 5G network repeater 105, utilizing the technicians and 5G CPEs or UEs to configure the 5G network repeater 105, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
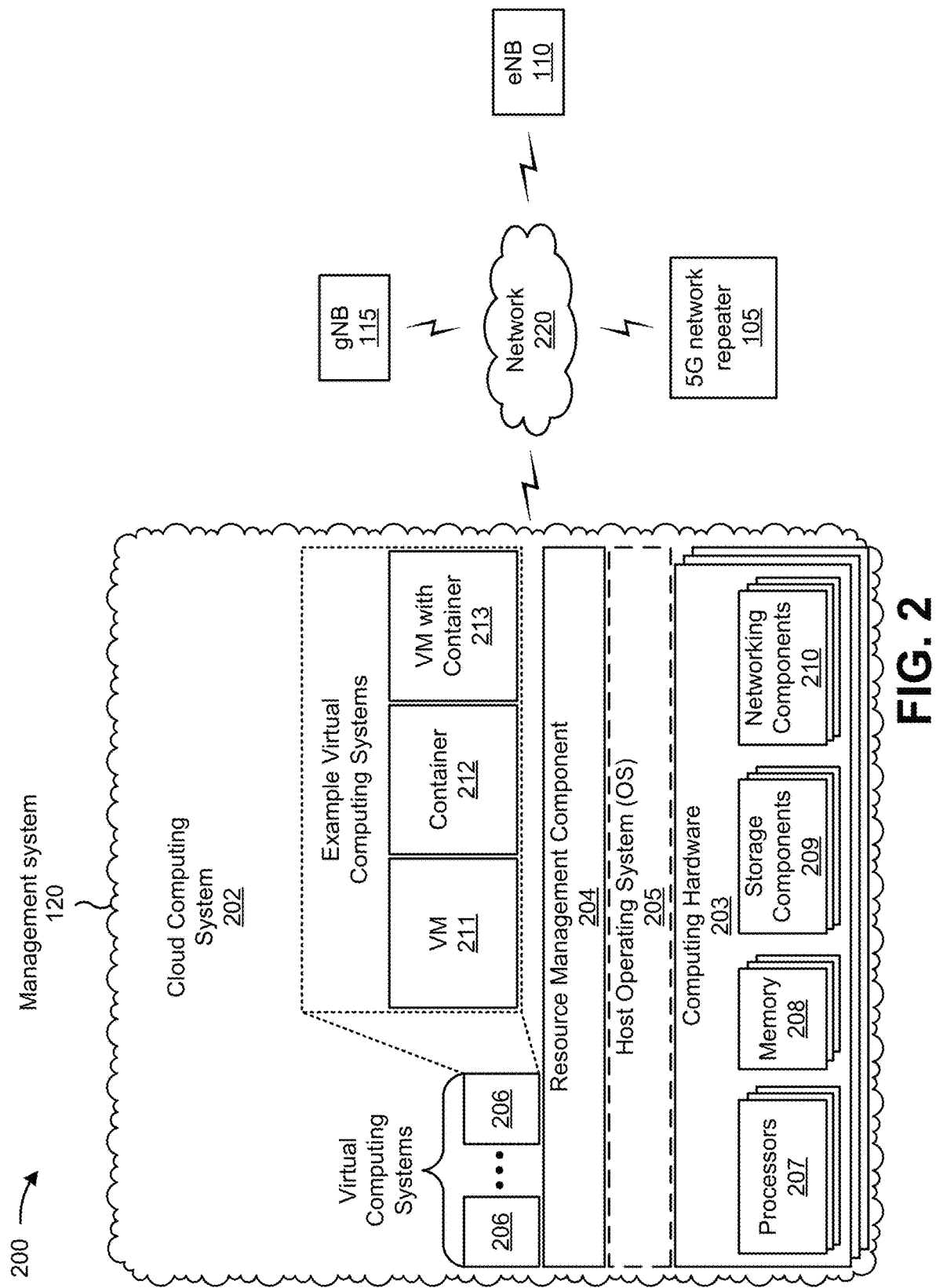
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include management system 120, which may include one or more elements of and/or may execute within a cloud computing system 202. The cloud computing system 202 may include one or more elements 203-213, as described in more detail below.

In some implementations, the management system 120 may include one or elements of and/or may execute within a multi-access edge computing (MEC) environment. In a MEC environment, computing is enabled by a network architecture that provides computing capabilities to a connected device (e.g., a 5G network repeater 105) via computing platforms at or near an edge of a network (e.g., a wireless communication network). Accordingly, because a MEC environment may provide computing at or near the edge of the network, increased performance may be achieved over networks in which computing is performed topologically and/or physically further from a connected device. For example, the MEC environment may offer improved performance due to less traffic and/or congestion between the connected device and the computing node(s), less latency (due to closer proximity to the connected device), increased flexibility (due to a greater amount of computing node(s)), and/or the like.

As further shown in FIG. 2, environment 200 may include a 5G network repeater 105, an eNB 110, a gNB 115, and/or a network 220. Devices and/or elements of environment 200 may interconnect via wired connections and/or wireless connections.

5G network repeater 105 includes a device that focuses a wireless signal towards a receiving device (e.g., eNB 110 or gNB 115) to create a direct, fast, and reliable connection with the receiving device. 5G network repeater 105 utilizes beamforming technology to perform functions similar to eNB 110 and/or gNB 115 and may add network density in terms of coverage for the millimeter wave spectrum (e.g., the 5G spectrum).

eNB 110 includes one or more devices capable of transferring traffic, such as audio, video, text, and/or other traffic. In some implementations, eNB 110 may include an eNB associated with an LTE network that receives traffic and/or sends traffic. Additionally, or alternatively, eNB 110 may not be associated with an LTE network. In some implementations, eNB 110 may include a small cell base station, such as a base station of a microcell, a picocell, a femtocell, and/or the like.

gNB 115 may support, for example, a cellular radio access technology (RAT). gNB 115 may include one or more base stations (e.g., base transceiver stations, radio base stations, gNBs, base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication. gNB 115 may transfer traffic between UEs (e.g., using a cellular RAT), one or more other gNBs 115 (e.g., using a wireless interface or a backhaul interface, such as a wired backhaul interface), and/or a core network. gNB 115 may provide one or more cells that cover geographic areas.

The cloud computing system 202 includes computing hardware 203, a resource management component 204, a host operating system (OS) 205, and/or one or more virtual computing systems 206. The resource management component 204 may perform virtualization (e.g., abstraction) of computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices.

For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, and/or the like) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, a hybrid environment 213 that includes a virtual machine and a container, and/or the like. A virtual computing system 206 may execute one or more applications using a file system that includes binary files, software libraries, and/or other resources required to execute applications on a guest operating system (e.g., within the virtual computing system 206) or the host operating system 205.

Although management system 120 may include one or more elements 203-213 of the cloud computing system 202, may execute within the cloud computing system 202, and/or may be hosted within the cloud computing system 202, in some implementations, management system 120 may not be cloud-based (e.g., may be implemented outside of a cloud computing system) or may be partially cloud-based. For example, management system 120 may include one or more devices that are not part of the cloud computing system 202, such as device 300 of FIG. 3, which may include a standalone server or another type of computing device. Management system 120 may perform one or more operations and/or processes described in more detail elsewhere herein, such as for management system 120.

Network 220 includes one or more wired and/or wireless networks. For example, network 220 may include a cellular network, a public land mobile network (PLMN), a local area network (LAN), a wide area network (WAN), a private network, the Internet, and/or the like, and/or a combination of these or other types of networks. The network 220 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
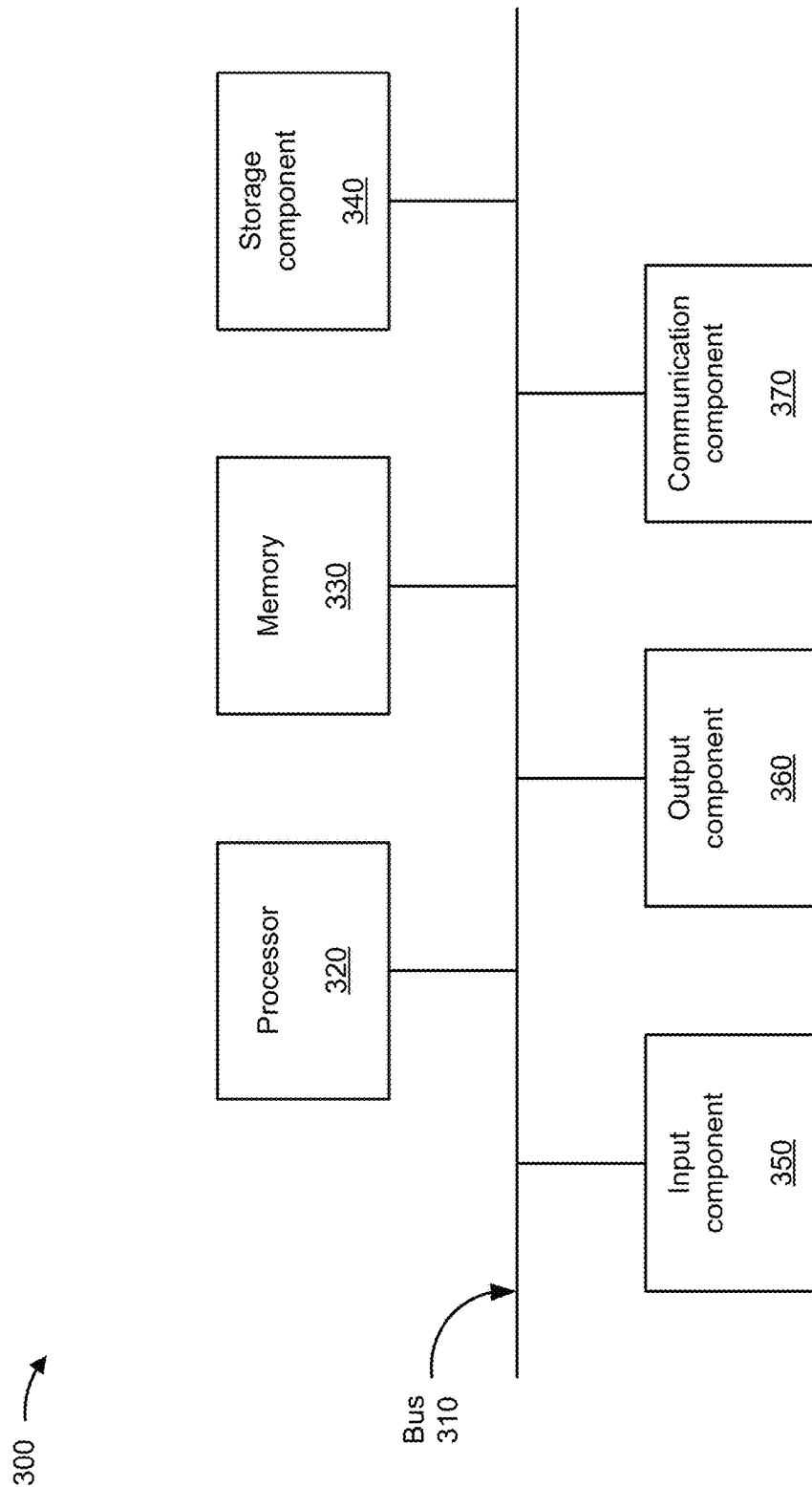
FIG. 3 is a diagram of example components of one or more devices of FIG. 2.

FIG. 3 is a diagram of example components of a device 300, which may correspond to 5G network repeater 105, eNB 110, gNB 115, and/or management system 120. In some implementations, 5G network repeater 105, eNB 110, gNB 115, and/or management system 120 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
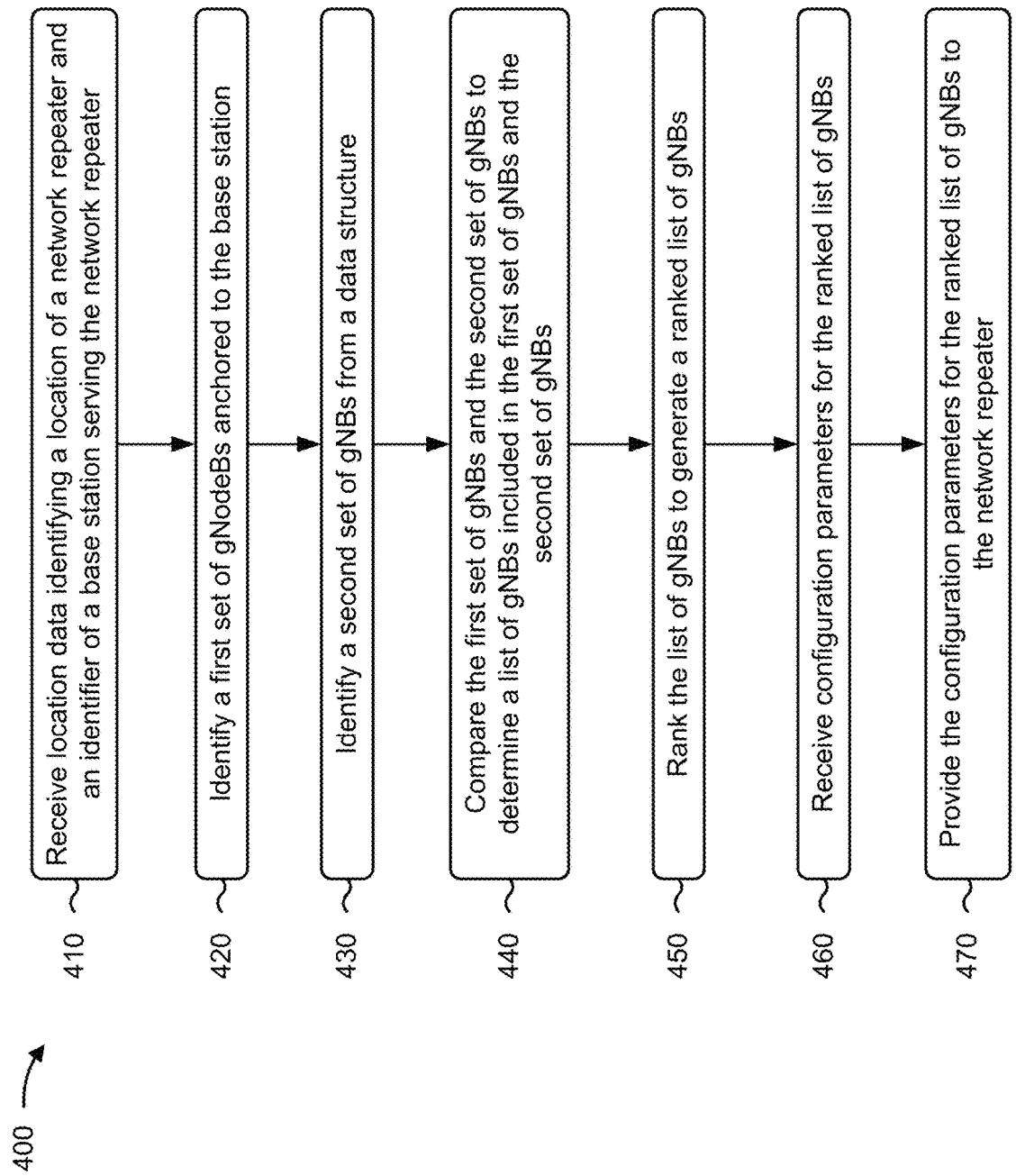
FIG. 4 is a flowchart of an example process relating to autonomously configuring 5G network repeaters.

FIG. 4 is a flowchart of an example process 400 associated with autonomously configuring 5G network repeaters. In some implementations, one or more process blocks of FIG. 4 may be performed by a device (e.g., management system 120). In some implementations, one or more process blocks of FIG. 4 may be performed by another device or a group of devices separate from or including the device, such as a 5G network repeater (e.g., 5G network repeater 105), an eNB (e.g., eNB 110), and/or a gNB (e.g., gNB 115). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving location data identifying a location of a network repeater and an identifier of a base station serving the network repeater (block 410). For example, the device may receive location data identifying a location of a network repeater and an identifier of a base station serving the network repeater, as described above. The base station may include an LTE base station and/or a new radio frequency range base station. The location data may include a GPS location of the network repeater. The network repeater may include a millimeter wave device. The network repeater may automatically attach to the base station, when powered on and based on a proximity between the network repeater and the base station.

As further shown in FIG. 4, process 400 may include identifying a first set of gNBs anchored to the base station (block 420). For example, the device may identify, based on the identifier of the base station, a first set of gNBs anchored to the base station, as described above.

As further shown in FIG. 4, process 400 may include identifying a second set of gNBs from a data structure (block 430). For example, the device may identify, based on the location data, a second set of gNBs from a data structure, as described above. In some implementations, when identifying the second set of gNBs, the device may provide, to the data structure, a query that requests identification of gNBs within a distance threshold of the location data. The device may receive, from the data structure, information identifying the second set of gNBs based on the query.

As further shown in FIG. 4, process 400 may include comparing the first set of gNBs and the second set of gNBs to determine a list of gNBs included in the first set of gNBs and the second set of gNBs (block 440). For example, the device may compare the first set of gNBs and the second set of gNBs to determine a list of gNBs included in the first set of gNBs and the second set of gNBs, as described above. When comparing the first set of gNBs and the second set of gNBs to determine the list of gNBs included in the first set of gNBs and the second set of gNBs, the device may identify gNBs included in the first set of gNBs that match gNBs included in the second set of gNBs and may create the list of gNBs based on the identified gNBs.

As further shown in FIG. 4, process 400 may include ranking the list of gNBs to generate a ranked list of gNBs (block 450). For example, the device may rank the list of gNBs, based on coverage projection recommendations, to generate a ranked list of gNBs, as described above. In some implementations, when ranking the list of gNBs to generate the ranked list of gNBs, the device may assign scores to gNBs provided in the list of gNBs based on the coverage projection recommendations associated with the gNBs provided in the list of gNBs. The device may rank the gNBs provided in the list of gNBs, based on the scores, to generate the ranked list of gNBs.

As further shown in FIG. 4, process 400 may include receiving configuration parameters for the ranked list of gNBs (block 460). For example, the device may receive, from the data structure, configuration parameters for the ranked list of gNBs, as described above. The configuration parameters may include MIB data and/or SIB data.

In some implementations, the configuration parameters may allow the network repeater to be automatically beam aligned and configured for attaching to the particular gNB provided in the ranked list of gNBs. Alternatively, and/or additionally, the configuration parameters may allow the network repeater to automatically attach to a particular gNB provided in the ranked list of gNBs. In some implementations, the configuration parameters may include absolute RF channel numbers associated the ranked list of gNBs, a band of operation (e.g., n260, n261, and/or the like) associated with the ranked list of gNBs, time division duplex timing information associated with the ranked list of gNBs, periodicity, uplink symbols, downlink symbols, uplink slots, downlink slots, a slot format indicator, subcarrier offsets associated with the ranked list of gNBs, subcarrier spacings associated with the ranked list of gNBs, and/or physical cell identifiers associated with the ranked list of gNBs.

As further shown in FIG. 4, process 400 may include providing the configuration parameters for the ranked list of gNBs to the network repeater (block 470). For example, the device may provide the configuration parameters for the ranked list of gNBs to the network repeater, as described above. In some implementations, when providing the configuration parameters for the ranked list of gNBs to the network repeater, the device may provide, to the network repeater, first configuration parameters associated with a first gNB provided in the ranked list of gNBs. The device may determine whether the network repeater fails to attach to the first gNB. When the network repeater fails to attach to the first gNB, the device may provide, to the network repeater, second configuration parameters associated with a second gNB provided in the ranked list of gNBs and may determine that the network repeater attaches to the second gNB.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, location data identifying a location of a network repeater and an identifier of a base station serving the network repeater;
   identifying, by the device and based on the identifier of the base station, a first set of gNodeBs anchored to the base station;
   identifying, by the device and based on the location data, a second set of gNodeBs from a data structure;
   comparing, by the device, the first set of gNodeBs and the second set of gNodeBs to determine a list of gNodeBs included in the first set of gNodeBs and the second set of gNodeBs;
   ranking, by the device, the list of gNodeBs, based on coverage projection recommendations, to generate a ranked list of gNodeBs;
   receiving, by the device and from the data structure, configuration parameters for the ranked list of gNodeBs,
   wherein the configuration parameters allow the network repeater to automatically attach to a particular gNodeB provided in the ranked list of gNodeBs; and
   providing, by the device, the configuration parameters for the ranked list of gNodeBs to the network repeater.

2. The method of claim 1, wherein the configuration parameters include one or more of:
   master information block data, or
   system information blocks data.

3. The method of claim 1, wherein the base station includes one of a Long Term Evolution base station or a 5G base station.

4. The method of claim 1, wherein the configuration parameters include a band of operation associated with the ranked list of gNodeBs.

5. The method of claim 1, wherein the configuration parameters include one or more of:
   absolute radio frequency channel numbers associated the ranked list of gNodeBs,
   time division duplex timing information associated with the ranked list of gNodeBs,
   subcarrier offsets associated with the ranked list of gNodeBs,
   subcarrier spacings associated with the ranked list of gNodeBs, or
   physical cell identifiers associated with the ranked list of gNodeBs.

6. The method of claim 1, wherein providing the configuration parameters for the ranked list of gNodeBs to the network repeater comprises:
   providing, to the network repeater, first configuration parameters associated with a first gNodeB provided in the ranked list of gNodeBs;
   determining whether the network repeater fails to attach to the first gNodeB;
   providing, to the network repeater and when the network repeater fails to attach to the first gNodeB, second configuration parameters associated with a second gNodeB provided in the ranked list of gNodeBs; and
   determining that the network repeater attaches to the second gNodeB.

7. A device, comprising:
   one or more processors configured to:
   receive location data identifying a location of a network repeater and an identifier of a base station serving the network repeater;
   identify, based on the identifier of the base station, a first set of gNodeBs anchored to the base station;
   identify, based on the location data, a second set of gNodeBs from a data structure;
   compare the first set of gNodeBs and the second set of gNodeBs to determine a list of gNodeBs included in the first set of gNodeBs and the second set of gNodeBs;

rank the list of gNodeBs, based on coverage projection recommendations, to generate a ranked list of gNodeBs;

receive, from the data structure, configuration parameters for the ranked list of gNodeBs, wherein the configuration parameters allow the network repeater to be automatically beam aligned and configured for attaching to the particular gNodeB provided in the ranked list of gNodeBs; and provide the configuration parameters for the ranked list of gNodeBs to the network repeater to allow the network repeater to automatically attach to a particular gNodeB provided in the ranked list of gNodeBs.

8. The device of claim 7, wherein the one or more processors, when identifying, based on the location data, the second set of gNodeBs from the data structure, are configured to:

provide, to the data structure, a query that requests identification of gNodeBs within a distance threshold of the location data; and receive, from the data structure, information identifying the second set of gNodeBs based on the query.

9. The device of claim 7, wherein the one or more processors, when comparing the first set of gNodeBs and the second set of gNodeBs to determine the list of gNodeBs included in the first set of gNodeBs and the second set of gNodeBs, are configured to:

identify gNodeBs included in the first set of gNodeBs that match gNodeBs included in the second set of gNodeBs; and create the list of gNodeBs based on the identified gNodeBs.

10. The device of claim 7, wherein the one or more processors, when ranking the list of gNodeBs, based on the coverage projection recommendations, to generate the ranked list of gNodeBs, are configured to:

assign scores to gNodeBs provided in the list of gNodeBs based on the coverage projection recommendations associated with the gNodeBs provided in the list of gNodeBs; and rank the gNodeBs provided in the list of gNodeBs, based on the scores, to generate the ranked list of gNodeBs.

11. The device of claim 7, wherein the network repeater includes a millimeter wave device.

12. The device of claim 7, wherein the network repeater automatically attaches to the base station, when powered on and based on a proximity between the network repeater and the base station.

13. A non-transitory computer-readable medium storing a set of instructions, the set of instructions comprising:

one or more instructions that, when executed by one or more processors of a device, cause the device to:

receive location data identifying a location of a network repeater and an identifier of a base station serving the network repeater;

identify, based on the identifier of the base station, a first set of gNodeBs anchored to the base station;

identify, based on the location data, a second set of gNodeBs from a data structure;

compare the first set of gNodeBs and the second set of gNodeBs to determine a list of gNodeBs included in the first set of gNodeBs and the second set of gNodeBs;

rank the list of gNodeBs, based on coverage projection recommendations, to generate a ranked list of gNodeBs;

receive, from the data structure, configuration parameters for the ranked list of gNodeBs; and cause the network repeater to automatically attach to a particular gNodeB provided in the ranked list of gNodeBs based on the configuration parameters for the ranked list of gNodeBs.

14. The non-transitory computer-readable medium of claim 13, wherein the configuration parameters include one or more of:

absolute radio frequency channel numbers associated the ranked list of gNodeBs, time division duplex timings associated with the ranked list of gNodeBs, subcarrier offsets associated with the ranked list of gNodeBs, subcarrier spacings associated with the ranked list of gNodeBs, or physical cell identifiers associated with the ranked list of gNodeBs.

15. The non-transitory computer-readable medium of claim 13, wherein the one or more instructions, that cause the device to cause the network repeater to automatically attach to the particular gNodeB, cause the device to:

provide, to the network repeater, first configuration parameters associated with a first gNodeB provided in the ranked list of gNodeBs;

determine whether the network repeater fails to attach to the first gNodeB;

provide, to the network repeater and when the network repeater fails to attach to the first gNodeB, second configuration parameters associated with a second gNodeB provided in the ranked list of gNodeBs; and determine that the network repeater attaches to the second gNodeB, wherein the second gNodeB corresponds to the particular gNodeB.

16. The non-transitory computer-readable medium of claim 13, wherein the one or more instructions, that cause the device to identify, based on the location data, the second set of gNodeBs from the data structure, cause the device to:

provide, to the data structure, a query that requests identification of gNodeBs within a distance threshold of the location data; and receive, from the data structure, the second set of gNodeBs based on the query.

17. The non-transitory computer-readable medium of claim 13, wherein the one or more instructions, that cause the device to compare the first set of gNodeBs and the second set of gNodeBs to determine the list of gNodeBs included in the first set of gNodeBs and the second set of gNodeBs, cause the device to:

identify gNodeBs included in the first set of gNodeBs that match gNodeBs included in the second set of gNodeBs; and create the list of gNodeBs based on the identified gNodeBs.

18. The non-transitory computer-readable medium of claim 13, wherein the one or more instructions, that cause the device to rank the list of gNodeBs, based on the coverage projection recommendations, to generate the ranked list of gNodeBs, cause the device to:

assign scores to gNodeBs provided in the list of gNodeBs based on the coverage projection recommendations associated with the gNodeBs provided in the list of gNodeBs; and rank the gNodeBs provided in the list of gNodeBs, based on the scores, to generate the ranked list of gNodeBs.

19. The method of claim 1, wherein identifying the, based on the location data, the second set of gNodeBs from the data structure includes:
   providing, to the data structure, a query that requests identification of gNodeBs within a distance threshold of the location data; and
   receiving, from the data structure, the second set of gNodeBs based on the query.

20. The device of claim 7, wherein the configuration parameters include one or more of:
   absolute radio frequency channel numbers associated the ranked list of gNodeBs,
   time division duplex timing information associated with the ranked list of gNodeBs,
   subcarrier offsets associated with the ranked list of gNodeBs,
   subcarrier spacings associated with the ranked list of gNodeBs, or
   physical cell identifiers associated with the ranked list of gNodeBs.

* * * * *